United States Patent [19]

Williamson

[11] Patent Number: 4,803,053

[45] Date of Patent: Feb. 7, 1989

[54] LABORATORY GLASSWARE EQUIPMENT

[76] Inventor: Kenneth L. Williamson, 43 Woodbridge St., South Hadley, Mass. 01075

[21] Appl. No.: 6,018

[22] Filed: Jan. 22, 1987

[51] Int. Cl.$^4$ ............................ B01L 3/00; B01L 9/06
[52] U.S. Cl. .................................... 422/101; 422/99; 422/103; 422/104; 285/235; 285/423; 285/921; 222/570
[58] Field of Search ................. 422/99, 102, 103, 101, 422/104; 285/235, DIG. 22, 423, 921; 222/570; 436/177

[56] References Cited

U.S. PATENT DOCUMENTS

| | | | |
|---|---|---|---|
| 2,052,046 | 8/1936 | Lambie | 285/18 X |
| 2,812,958 | 11/1957 | Rogers | 285/18 X |
| 3,563,574 | 2/1971 | Jackson et al. | 285/423 X |
| 3,633,947 | 1/1972 | Nelson | 285/921 X |
| 3,945,617 | 3/1976 | Callery | 222/570 X |
| 4,275,907 | 6/1981 | Hunt | 285/18 X |
| 4,395,382 | 7/1983 | Miskinis | 422/103 |
| 4,603,886 | 8/1986 | Pallini, Jr. et al. | 285/18 X |
| 4,611,829 | 9/1986 | Hughes | 285/18 |

FOREIGN PATENT DOCUMENTS 0037487  3/1977  Japan ................................ 436/176

Primary Examiner—Benoît Castel
Assistant Examiner—Lynn Kummert
Attorney, Agent, or Firm—Pearne, Gordon, McCoy & Granger

[57] ABSTRACT

A unique laboratory glassware system is provided which includes glass functional members and an elastomeric coupling member for joining two of the functional members in axial alignment. Each of the functional members has a conduit portion terminating in a male sealing portion. The male sealing portion comprises an annular flange with a front conical surface and a rear locking shoulder. The coupling member includes a central opening having a gasket portion separating two axially aligned bores that include a female sealing portion corresponding in profile to the male sealing portion. The conduit portion of the functional members form a positive engagement with the female sealing portion of the coupling member such that the joined functional members snap into position and are locked against internal pressure that could pull them apart. The glassware system presents advantages at standard sizes, but is particularly well suited for microscale glassware where the functional members having a conduit portion with an outer diameter of 15 millimeters or less.

22 Claims, 3 Drawing Sheets

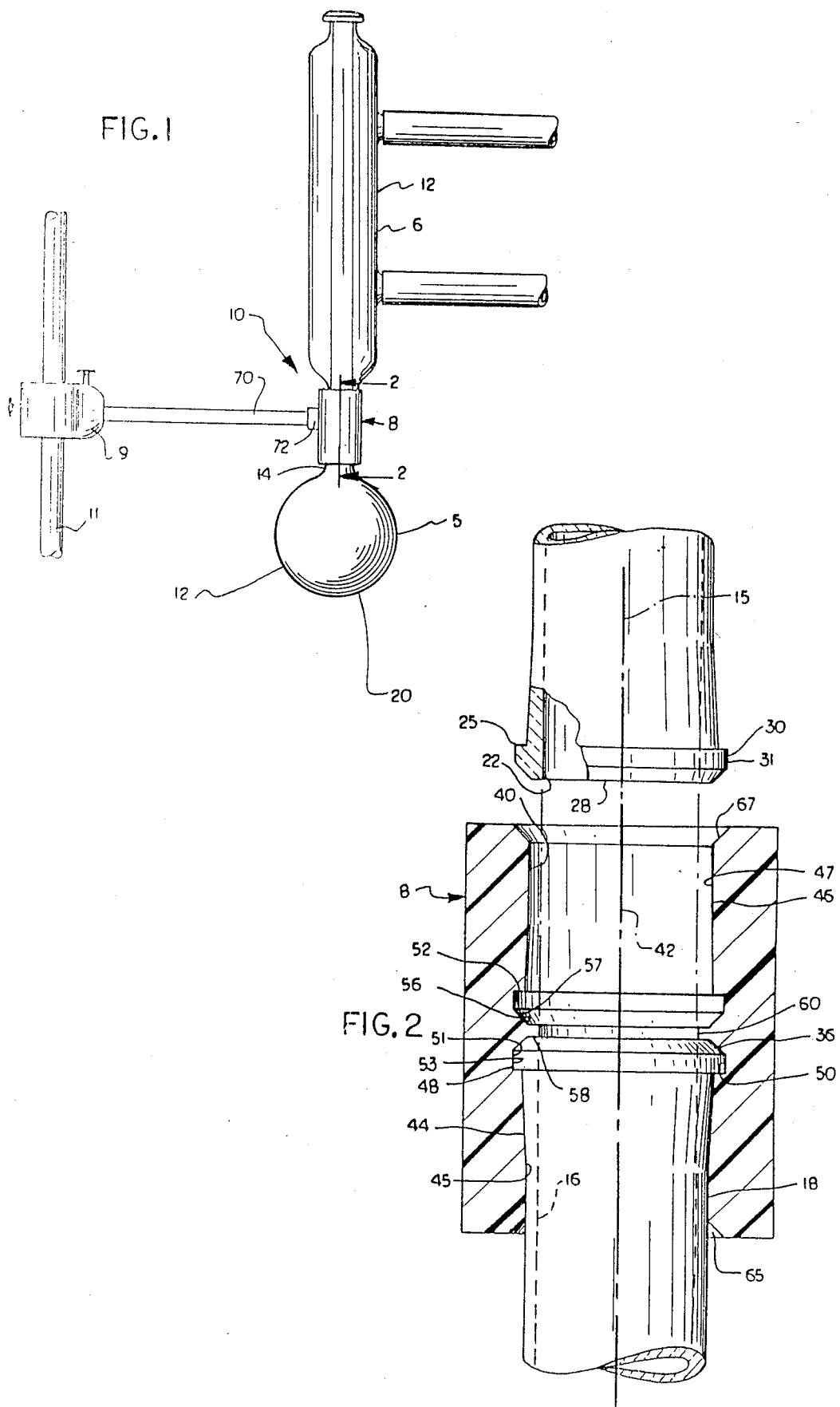

4,803,053

LABORATORY GLASSWARE EQUIPMENT

BACKGROUND OF THE INVENTION

This invention relates to improved laboratory equipment used in performing scientific experiments such as those in the chemistry laboratory. The coupling system allows the traditional elements of laboratory equipment—flasks, distilling columns, thermometer adapters, distillation heads, vacuum adapters, etc.—to be joined by means of a polymeric or elastomeric connector which mates with a specially formed coupling flange on the various elements of apparatus. This coupling member is resistant to heat and chemicals, can be easily assembled and disassembled and yet resists being separated axially, is gas, liquid and vacuum tight, will not leak liquids or gases under moderate internal pressure, is lightweight, is capable of making the apparatus self-supporting and more easily assembled, and it can be cut from the apparatus should it become stuck. The coupling member and corresponding glass members are axially symmetrical allowing rotation about the axis during use. The coupling member is bilaterally symmetrical perpendicular to the axis; the joints so formed have no male or female character. The joint is not restricted in diameter and has the same interior diameter as the tubing from which it is made. This allows unrestricted passage of solids, liquids and vapors and allows various devices to pass through and operate within the joint, devices such as spinning bands for distillation, and piston-like devices such as squeegee-like cleaners, and movable filters.

Further, the present laboratory equipment provides a means for performing such experiments on a scale much smaller than present common practice. During the past thirty years, the scale at which experimental work has been carried out in the college chemistry laboratory, in particular, the organic chemistry laboratory, has not changed, yet the analytical instruments available have increased in sensitivity by one or two orders of magnitude. Newly available, relatively, inexpensive weighing equipment, now makes small scale experimentation routinely possible, but reasonably priced laboratory glassware is not available.

Experimentation on a small scale is becoming mandatory. During the past two decades, the awareness and concern over the dangers of exposure to toxic substances—carcinogens, teratogens, mutagens, poisons, etc.,—have increased substantially. Regulations promulgated by the United States Environmental Protection Agency (EPA) limit the legal exposure to toxic substances. Adequate ventilation must be provided to all workers and there are strict limits on the amounts of toxic substances with which a worker can come in contact, be it by ingestion, absorption through the skin, or inhalation.

It is desirable to make use of the traditional, pedagogically, sound experiments which have evolved in the teaching of chemistry. This can be done while also reducing worker exposure to toxic substances by carrying out the experiments on a scale ten to one hundred times smaller than is now done.

The problem of disposal of hazardous laboratory waste is reduced when experiments are conducted on a small scale. In addition, smaller scale experiments reduce the cost of conducting experiments by reducing the quantities of chemicals used as reagents and solvents in reactions and used to clean apparatus after a reaction is finished. This cost reduction is especially significant for academic laboratories where the cost of materials is becoming prohibitive.

The amount of energy needed to heat and cool small scale experiments is reduced. The amount of space needed to store equipment and to conduct experiments is also lessened, resulting in reduced capital costs for new laboratories. Perhaps, most importantly, the amount of ventilation needed in a laboratory is drastically reduced. It now costs $1200 per year to operate one laboratory hood for one year at the latitude of New York City. Current recommendations call for one hood for each two students carrying out organic chemical experiments.

The present invention meets the foregoing concerns by providing laboratory equipment having a specially-designed coupling system especially suited to small scale experimentation. In addition to the previously listed advantages, the invention provides numerous advantages over the larger laboratory glassware systems of the prior art and can be utilized as traditional size laboratory glassware systems as well as at the smaller scale.

PRIOR ART

Prior art laboratory equipment includes glass tubing which includes integrally formed joints, such as standard-taper joints. That coupling system involves a tapered male joint having a ground exterior surface which cooperates with the ground interior surface of the female joint. Such joints are prone to leak gasses and liquids unless lubricated with grease. Grease from such joints then contaminates the interior of the apparatus. The male/female character of such joints makes it undesirable to utilize the joint upside down, with the male joint on the bottom, and it allows for the mating of the joint in only one direction, reducing the versatility of the apparatus to which the joint is attached. The joint is, of necessity, twice as thick as the tubing from which it is made, therefore, it has twice the heat capacity at this point as the tubing immediately above and below it. The inside diameter of the joint is smaller than the tubing from which it is made and it is not cylindrical, leading to restrictions in the flow of gases and liquids at this point. The combination of high heat capacity in the joint and a restricted diameter leads to the phenomenon during distillation called flooding.

Another failure of standard taper glassware is that various pieces of glassware are not self-supporting. Almost every individual piece of glassware that is joined together to build a reaction assembly must be supported by a clamp that is in turn clamped together in an elaborate scaffold system. This complicates construction of a reaction assembly since the glass pieces must be aligned, fit together, realigned and clamped in place on the scaffolding. This operation seems to require at least three hands to support the breakable glassware and endless patience to obtain a proper alignment and sealing of the pieces. In addition, it is possible for glass pieces to come apart, for example, by internal pressure which results from the reaction. As a result, the reaction must be halted or curtailed while the glassware is re-assembled and the clamps are realigned and tightened.

The ground glass interchangeable standard-taper joint must be manufactured to close tolerances involving several hand operations (rough grinding, fine grinding, gauging, washing and inspection). It is therefore, expensive. It is prone to stick when organic and inorganic material penetrates the ground surface and bonds the joint together. A recent and extremely expensive solution to this problem is found in a standard-taper joint equipped with a STL extracting nut (Safe-Lab). The all-glass, standard-taper joint is completely rigid and is not self-supporting unless each joint is equipped with an external clamp (the Keck Connection, Cole-Parmer Instrument Co.). Unless tightly clamped, it will open under slight internal pressure.

The Wheaton Connection, an alternative means for the connection of laboratory glassware, consists of threaded ends on the glass tubes which are joined by a connector having two threaded caps connected by a Teflon liner. This connector is bilaterally symmetric about the axis, but it is rigid, prone to come apart (unscrew) when turned about the axis, and it has a constricted bore. In the process of gathering enough glass to form glass threads on automatic equipment, it is necessary to restrict the bore of the tubing, creating an internal shoulder in the tubing. This shoulder makes it impossible to scrape semi-solid material from the interior of the apparatus and in the process of distillation, this small diameter bore restricts the flow vapors and liquids leading to flooding.

Coupling members are known for joining pipe members on vials which demonstrate some of the desired characteristics. Such coupling members are shown in U.S. Pat. No. 3,633,947 to Nelson and U.S. Pat. No. 3,945,617 to Callery. These coupling systems demonstrate shortcomings in expense and the ability to provide a leakproof, pressure-resistant joint and tube system suitable for use with laboratory glassware equipment.

SUMMARY OF THE INVENTION

The present invention incorporates a unique structure including a tubular conduit member on each functional unit of the laboratory equipment, each tubular conduit member having an open end with an integral coupling flange on its outer surface. The coupling flange has a forward frustoconical sealing portion and a square, rearward shoulder for securing the functional member against movement in the coupling member. The coupling member includes symmetrical apertures and two parallel molded recesses or bores each corresponding to the shape of the respective coupling flange. The tubular glass members are tooled on high-speed automatic apparatus to close tolerances. The coupling member is made of a chemically and heat resistant polymeric or elastomeric substance. The tubular glass portions do not touch, but contact a gasket portion of the connector formed or inserted between the two recesses. This gasket portion is resilient, conforms to any slight irregularities in the glass portion and, in conjunction with the conical sealing portions of the flange and recesses, forms a vacuum-tight seal when the apparatus is under reduced pressure. The joint is cylindrical and has a constant internal diameter which offers no restriction to the flow of liquids or gases.

In a second embodiment of the invention, a connection is formed which is permanent at room temperature. In this embodiment, the coupling member is constructed from an elastomer which is rigid at room temperature to prohibit disassembly but which can be softened by heat to permit assembly and disassembly.

An object of the invention is to provide a laboratory glassware system suitable for small scale clinical experiments.

Another object of the invention is to provide a glassware system which is self-supporting and lightweight and which forms a vacuum-tight seal to 0.001 millimeters of mercury and which resists pulling apart. Also, it will retain liquids and gases when subjected to moderate internal pressure.

It is a further object of the invention to provide a laboratory glassware system that is easily assembled and disassembled, and which eliminates the expense and dangers of "frozen" joints.

Another object of the invention is to provide a laboratory glassware system which incorporates means for accomplishing various functions which are performed during the course of normal experimentation and to provide an economical glassware system.

BRIEF DESCRIPTION OF THE DRAWINGS

FIG. 1 is a side view of a glassware assembly in accordance with the invention;

FIG. 2 is a cross-section of the conduit portions and coupling members taken along line 2—2;

FIG. 2a is a side perspective detail of the conduit portion of a functional member;

DETAILED DESCRIPTION OF THE DRAWINGS

Figure 3:
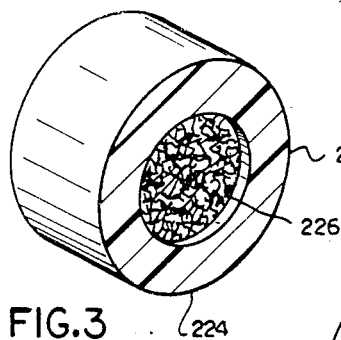
FIG. 3 is a front perspective of a filter support in accordance with the invention.

FIG. 1 shows the laboratory glassware system 10 in accordance with this invention. Specifically two functional members 12, including a round bottom flask 5 and a condenser 6, which are both supported from a coupling member 8 attached to a clamp 9 on a scaffold system 11. The glassware system can include functional members 12 other than a round bottom flask or distillation column such as others commonly used in the laboratory. Examples of functional members include reaction tubes; various size and shaped flasks, such as round bottom and pear-shaped flasks; Claisen and distilling heads; fractionating and condensing columns; and various distillation adapters and joints such as vacuum and thermometer adapters. These functional members are joined together to build a glassware structure or assembly so that the chemist can subject the chemicals to the conditions and processes which constitute the experiment.

Each functional member 12 has an end which includes a tubular conduit portion 14 having a smooth internal cylindrical surface 16 formed about a longitudinal axis 15 and a smooth external cylindrical surface 18. The hollow conduit 14 defines an opening 22 and provides access to the functional portion 20 of the functional member 12 which is illustrated as a round bottom flask.

The functional member 12 is typically constructed of a clear, transparent heat and chemical-resistant glass such as borosilicate glass. This allows the chemist to view the reaction, is inert to chemical reagents, and makes cleaning easier. The present design for the functional members 12 is well suited for the members to be manufactured by automated processes and at low cost. This is true whether the glassware is manufactured at standard 14/20 or 24/40 size or if the glassware is manufactured on a microscale having a 10 mm external diameter. Sometimes functional members may be manufactured of other materials, such as ceramic, when special properties are needed.

The conduit 14 terminates in a planar surface 28 which is tranverse to the longitudinal axis 15. The end of the conduit 14 further includes male sealing means 25 which serve the functions of sealing, alignment and support of the functional member in relation to the conduit and the other functional member as is shown in FIGS. 1 and 2. This is accomplished by interaction of the male and female sealing means and axial support of the coupling member along the external surface 18 of the conduit portion 14.

The male sealing means 25 comprises an annular flange 30 having an external surface 31 which is generally parallel to the longitudinal axis 15 of the conduit 14. The annular flange 30 has a diameter which is greater than the external diameter of the tubular conduit 14 so that a rear shoulder 34, having a depth which equals the difference in diameters, is formed between the flange 30 and the external surface 18 of the conduit 14. This rear shoulder 34 has a well-defined angle and is preferably about 90° plus or minus 10°. The front portion of the flange 30 forms a frustoconical surface 36 which is at an angle of about 45° plus or minus 10°. The frustoconical surface 36 terminates in the planar surface 28 which surrounds the opening 22 of the conduit 14.

The conduit 14 has an external diameter which increases slightly as it approaches the annular flange 30. This slight increase helps to secure the functional member 12 in the coupling member 8 and to resist pressure which could force the functional member 12 out of the coupling member 8.

The coupling member 8 has a central hole 40 having a longitudinal axis 42 which corresponds to the longitudinal axis 15 of the conduits 14 when they are coupled. The central hole 40 includes a first bore 44 and a second bore 46 which are axially aligned. The internal diameter of the bores 44, 46 corresponds to the external diameter of the conduit 14 so that the coupling member 8 supports the functional members 12 axially along the length of the bores 44, 46. Each bore 44, 46 terminates in female sealing means 48 which correspond as mirror images to the male sealing means 25 of the functional members 12. Further, the coupling member 8 is bilaterally symmetric about an axis perpendicular to the longitudinal axis 15. This relationship defines an identity or sameness of the female sealing means. More specifically, the female sealing means of the first bore is a mirror image of the female sealing means of the second bore so that a conduit 14 is equally well-received whether it is inserted into either end of the coupling member 8. This eliminates polarity or direction of the coupling member or joint.

The female sealing means 48 includes an annular groove 50 having a first portion 51 with longitudinal surfaces 53 that are parallel to the longitudinal axis 42. This portion 51 has a diameter which corresponds to the diameter of the annular flange 30. This diameter is greater than the diameter of the bores 44, 46 to form a right angle lip 52 that engages the rear shoulder 34 of the male sealing means 25.

The annular groove 50 also includes a second portion 56 which has a frustoconical internal surface 57 that corresponds to the frustoconical surface 36 and forms an angle of 45° plus or minus 10° to the longitudinal axis 42. The diameter of the frustoconical internal surface 57 decreases away from the first portion 51. The frustoconical internal surface 57 terminates in a planar sealing surface 58 which is transverse to the longitudinal axis 42. The planar sealing surface 88 forms a stop for the conduit 14 when it is inserted in the coupling member 8.

In the first embodiment of the coupling member 8 which is shown in FIGS. 1 and 2, the annular grooves 50 of the first and second bore 44, 46 oppose each other so that the sealing surfaces 58 of the two female sealing means form a central gasket 60 having a depth of about 0.5 to about 10 millimeters. The gasket 60 defines an internal opening 62 having an internal diameter that corresponds to the internal diameter of the conduit 14.

This consistent internal diameter avoids the prior art problems of obstructing the flow of liquids and vapors. The joint also avoids the problems caused by a higher heat capacity at the joint and resultant "flooding" as liquid builds up during distillation.

Figure 8:
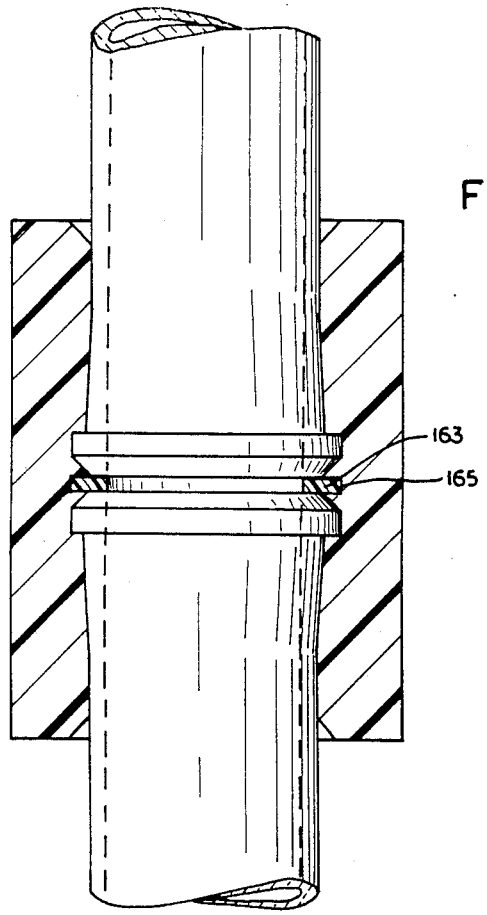
FIG. 8 is a second embodiment of the glassware system shown in side cross section.

This gasket 60 can be integral with the coupling member 8 as is shown in FIG. 2 or as shown in FIG. 8, it can be an insert 163 made of a different material such as polytetrafluoroethylene which is held in a concentric slot 165 in the central hole 40. This insert can also have a central mesh portion which acts as a filter to form filter disk. The embodiment shown in FIG. 8 has the advantage over the embodiment shown in FIG. 2 that the portion of the coupling member 8 which is exposed to the chemicals within the glassware system may be manufactured from a material which is extremely inert such as polytetrafluoroethylene.

The first and second bores 44, 46 of the coupling member 8 have internal surfaces 45, 47 that increase slightly in diameter toward the female sealing means 48 in a manner that corresponds to the slight increase in the external diameter of the conduit 14. At either end of the central hole 40 the bores 44, 46 each include an initial recess 65, 67 having a frustoconical shape which roughly corresponds to the size and shape of the frustoconical surface 32 of the male sealing means 25. These initial recesses 65, 67 first define openings having a diameter which is at least the diameter of the widest diameter of the annular flange 30. The internal surfaces of recesses 65, 67 taper to the diameter of the conduit 14. The initial recesses 65, 67 facilitate insertion of the male sealing means 25 into the central hole 40 of coupling member 8.

The conduit member 14 of the functional member 12 is inserted through one of the initial recesses 65, 67 into one of the bores 44, 46 of the coupling member 8. While the bores 44, 46 have a diameter which is smaller than the diameter of the annular flange 30, the coupling member 8 is made up of a material which is sufficiently elastic to accommodate the flange 30. The frustoconical surface 36 acts as a camming surface to help stretch the coupling member 8. The male sealing means 25 is inserted until it encounters the sealing surface 58 of the female sealing means 48. The lip 52 closes behind the shoulder 34 of the male sealing means. The user knows to stop pushing when the male sealing means hits the surface 58 and the user feels the conduit 14 snap into place in the coupling member 14.

A gastight seal is formed between the surfaces 28 and 58 as well as between the frustoconical surfaces 36 and 56 of the male and female sealing means 25, 48 respectively. The shape of the frustoconical surfaces serve to insure sealing even if the functional member 12 is slightly out of alignment in the coupling member 8. The positive engagement of the lip 52 and the shoulder 34 holds the forward surfaces of the male and female sealing means in a sealing contact. This engagement also serves to support the functional members 12 in the coupling member 8 and to hold the functional members 12 against axial pressures which would tend to pull the members 12 out of the coupling member 8. Accidental disengagement is almost impossible in the present invention. In contrast, it is not unusual for axial pressures to build for example, in a flask joined to a distillation column, causing a standard taper glass joint to come apart and for the gaseous reactants to leak into the atmosphere. This also causes problems in realigning the various glassware.

Figure 9:
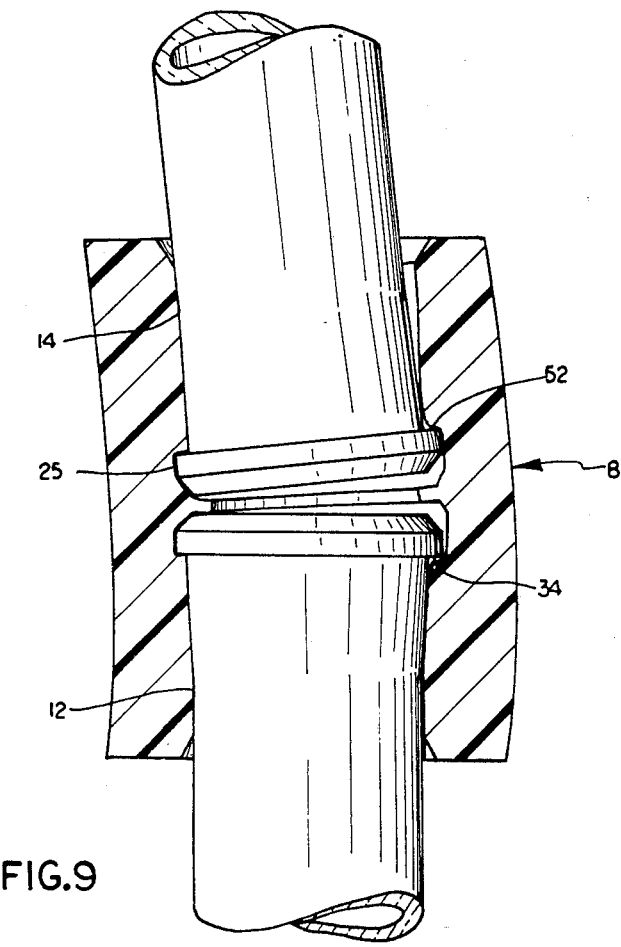
FIG. 9 is an illustration of the distortion of the coupling member required for disassembly.

FIG. 9 illustrates the distortion which the coupling member 8 must undergo in order to disengage both of the functional members 12. This distortion depends on the elastomeric nature of the coupling member 8. If the coupling member 8 is constructed of a material which is quite rigid and softened by heat, the joint may be made permanent at room temperature. Removal of the functional member 12 may be accomplished by heating the elastomer or by cutting the coupling member 8 from the functional member 12.

On the other hand, in the usual embodiment, the coupling member 8 is made of a material which is sufficiently elastic to allow the functional member 12 to be intentionally pulled from the coupling member 8. In addition, the material must be relatively heat resistant (at temperatures up to about 200° C.) and resistant to organic solvents which are generally used in the laboratory such as water, methyl and ethyl alcohol, ethyl ether and benzene as well as concentrated acids and bases and oxidizing and reducing agents. It is an additional economic advantage if the material is suitable for high speed, high volume manufacturing techniques such as injection molding techniques. Suitable elastomers which can be used are a thermoplastic rubber manufactured by Monsanto under the trademark "Santoprene", and "Geolast" also sold by Monsanto. "Santoprene" is a preferred material for manufacture of the coupling members for the undergraduate classroom. "Geolast" is an elastomer alloy of vulcanized nitrile rubber in a thermoplastic polypropylene matrix. Neoprene rubber is another suitable material. Silicone rubber also is a preferred material as it has all of the desirable properties: great chemical and heat resistance, resiliency, and good sealing characteristics. Of course, it should be understood that any material having the suitable heat resistance, elasticity, rigidity and chemical resistance could be used.

As is shown in FIG. 1, the coupling member 8 can include a support rod 70 which is made of any suitably strong and rigid material, such as metal, or heat resistant plastic. The rod 70 is supported in a sleeve 72 that is a hollow projection formed in the coupling member 8. The rod 70 engages the customary scaffold system. As can be seen in FIG. 1, the coupling member 8 and rod 70 can be used as the sole support for a glassware assembly 10.

The present invention was designed in particular for use with micro-scale experiments. At this size, the conduit 14 and bores 44, 46 may have an outer diameter of 10 mm. The conduit 14 and gasket opening 62 have an inner diameter of about 8.5 mm. The annular flange 30 and groove 50 have diameters of about 11.5 mm. The gasket has a preferred width ranging from 0.6 to 1.5 mm. The frustoconical surface has a depth of about 0.8 mm, while the entire annular flange has a depth of about 1.6 mm. The coupling member has an external diameter of about 17 mm, and a length of about 21 mm. The micro-scale equipment may also be constructed for conduit 14 having an external diameter of 15 mm with all elements having proportionately larger dimensions. These same dimensions may be used for standard scale glassware.

Figure 4:
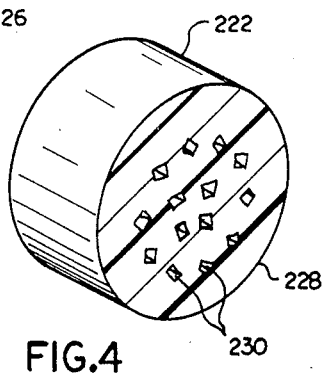
FIG. 4 is a front perspective of another filter support in accordance with the invention.
Figure 5:
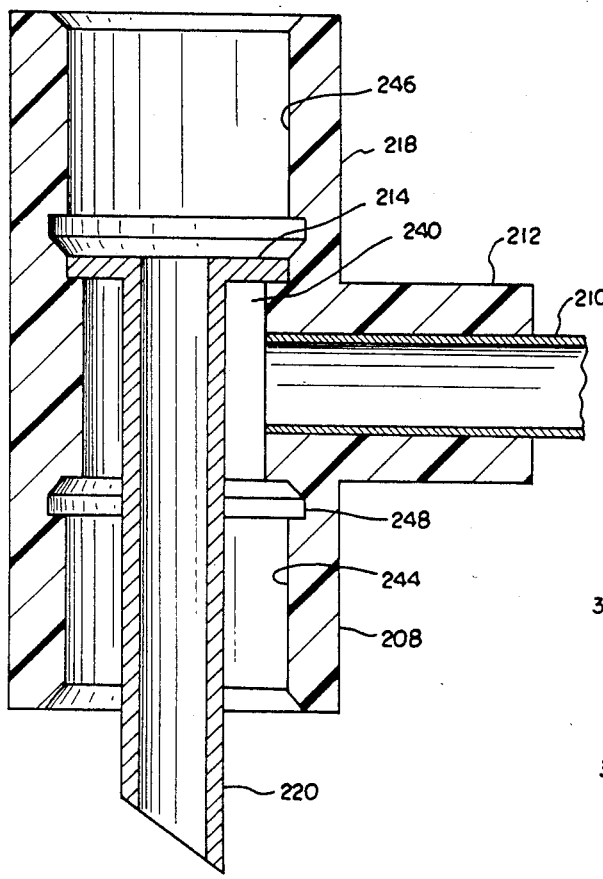
FIG. 5 is a side cross section of a vacuum adapter in accordance with the invention.

FIGS. 3–7 illustrate additional elements of the present glassware system. FIG. 5 illustrates a coupling member 208 which has a central hole 240 with first and second bores 244, 246 each having female sealing means 248 to receive the male sealing means 25 of the functional members 12 as was described earlier.

The coupling member 208 does not have a central gasket between the functional members but has instead, an elongate center opening with a side hollow pipe 210 supported by an integral sleeve 212 in the coupling member 208. A vacuum is drawn through the side pipe 210 which lowers the pressure in the lower functional member 12 (not shown). The opening in the upper functional member 12 is partially sealed by a gasket member 214 which extends to flow tube 220 that reaches into the conduit 14 of the lower functional member. The lower pressure in the lower functional member 12 tends to suction the contents of the upper functional member 12 into the lower functional member.

A filter 222 such as the filters shown in FIGS. 3 and 4 are supported in the opening 22 of the upper functional member. FIG. 3 illustrates a mesh filter 224 having a permanent center mesh or screen 226 which traps the residue from the filtrate. FIG. 4 illustrates a filter support 228 having several flow openings 230 through which the filtrate flows. A small piece of filter paper used with this support to catch the residue.

Figure 7:
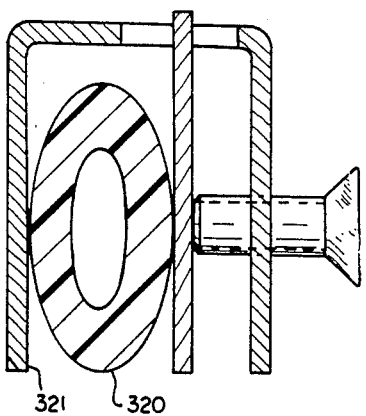
FIG. 7 is a top cross section of the valve shown in FIG. 6 with closure means taken along line 7—7.
Figure 6:
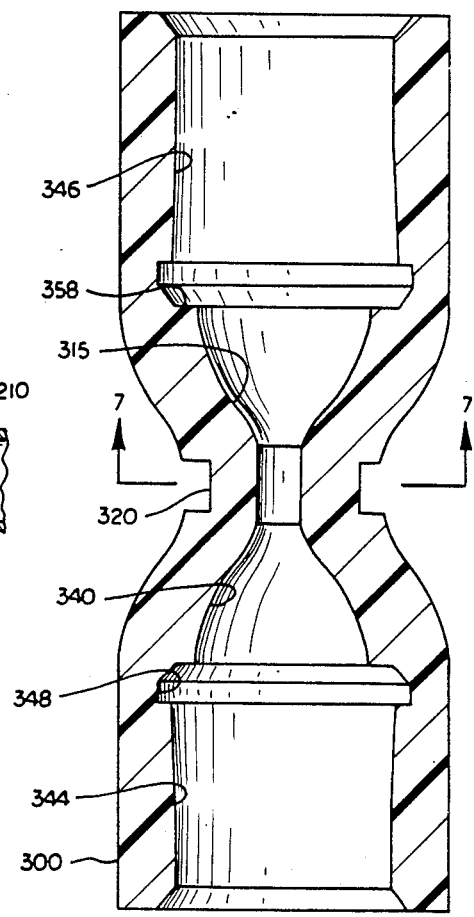
FIG. 6 is a side cross section of a valve in accordance with the invention.

FIGS. 6 and 7 illustrate a valve 300 used with the glassware system of the present invention. The valve 300 has a central hole 340 having a first and second bore 344, 346 each terminating in female sealing means 348. Again, this valve has no central gasket. The planar openings 28 of the functional members engage planar surfaces 358 of the female sealing means 348. The valve 300 has an elongate opening 315 between the female sealing means 348 which includes a wasp-waisted portion 320 having a restricted internal and external diameter which can be closed by means of a clamp 321 such as is shown in FIG. 7.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. Laboratory equipment comprising:

two functional members each having an identical tubular conduit portion;

the tubular conduit portion having a central axis and a smooth uninterrupted interior surface defined by a substantially constant inner diameter so as to form a nonrestricted internal passageway about the central axis, the tubular conduit portion further having an end terminating to form a planar opening with male sealing means adjacent the planar opening, said male sealing means comprising an annular flange having a forward conical surface increasing in diameter from the planar opening and the flange forming a rearward shoulder that defines a surface symmetrical about said axis and with a cone angle plus or minus 10° relative to a plane perpendicular to said central axis, the radially outward portion of said shoulder terminating in a sharp circumferential edge defined by said symmetrical surface and a cylindrical surface of said male joint means and a coupling member having bore means comprising means defining a first and a second bore each having a first and a second end, the first and second bores being aligned about a central axis, the second end of the first bore opposing the second end of the second bore, the first and second bores each terminating in a coupling member opening at the first end and in stop means comprising seating members having means defining a central hole and an annular planar surface which cooperates and is coextensive with the planar opening of the tubular conduit portion, and the seating members comprise a gasket having means defining a central hole, the diameter of the hole substantially corresponding to the inner diameter of the tubular conduit portions and the gasket having a cross-sectional depth of 0.5 to 3 millimeters, the stop means adjoining female sealing means, each female sealing means comprising an annular groove having a forward conical surface increasing in diameter toward the opening and a rearward shoulder engaging said rearward shoulder on said male sealing means so that the female sealing means substantially corresponds to the male sealing means and cooperates with the male sealing means to support the functional members in axial alignment and to form a seal and the rearward shoulders of the male and female sealing means cooperating to resist an axial force tending to urge the tubular conduit portion out of the coupling member.

2. A laboratory glassware system comprised of:

first and second functional members, said first and second members each having conduit portions defining an axis and including male joint means, said male joint means including an annular flange with a rearwardly facing shoulder that defines a surface symmetrical about said axis and with a cone angle plus or minus 10° relative to a plane perpendicular to said axis, the radially outward portion of said shoulder terminating in a sharp circumferential edge defined by said symmetrical surface and a cylindrical surface of said male joint means; and an elastomeric coupling member having means defining a central opening about a longitudinal central axis, said opening defining first and second bores having longitudinally aligned first and second female joint means, the central opening being radially symmetrical and bilaterally symmetric perpendicular to the longitudinal axis to define an identity of the first and second female joint means, and said female joint means including a lip engaging said shoulder on said male joint means;

the first functional member being operatively connected to the second functional member by the coupling member such that the first and second functional members can be supported in axial alignment by the coupling member and the coupling member resists axial force tending to separate the functional members, the male joint means of the first and second functional members cooperating with the first and second female joint means to form a gas and liquid-tight seal whereby the seal is formed by inserting a conduit portion in an axial direction into the first bore until the first male joint means snaps into cooperation with the first female joint means and inserting a second conduit portion into the second bore until the second male joint means snaps into cooperation with the second female joint means.

3. A laboratory glassware system as set forth in claim 2 wherein:

the conduit portion of the first and second functional members both define an inner diameter which is the same and the conduit portions engage the coupling member so as to define a relatively constant inner diameter along the longitudinal central axis.

4. A laboratory glassware system as set forth in claim 2 wherein the conduit portions of the first and second functional members have outer diameters of about 8 mm to about 16 mm.

5. A laboratory glassware system as set forth in claim 2 wherein:

the coupling member includes support means extending from the coupling member such that the laboratory glassware system can be supported by the support means.

6. A laboratory glassware system as set forth in claim 5 wherein the support means comprises a rod integrally attached to and extending from the coupling member.

7. A laboratory glassware system as set forth in claim 2 wherein the coupling member comprises an elastomer which is resistant to heat to temperatures of 200° C. and resistant to corrosion on exposure to methyl alcohol, ethyl alcohol, benzene, ethyl ether and water.

8. A laboratory glassware system as set forth in claim 7 wherein the coupling member is manufactured by an injection molding process.

9. A laboratory glassware system as set forth in claim 7 wherein the coupling member comprises a vulcanized nitrile rubber in a thermoplastic polypropylene matrix.

10. A laboratory glassware system comprising:

two functional members each having an identical tubular conduit portion:

the tubular conduit portion having a central axis and a smooth uninterrupted interior surface defined by a substantially constant inner diameter so as to form a nonrestricted internal passageway about the central axis, the tubular conduit portion further having an end terminating to form a planar opening with male sealing means adjacent the planar opening, said male sealing means comprising an annular flange having a forward conical surface increasing in diameter from the planar opening and the flange forming a rearward shoulder that defines a surface symmetrical about said axis and with a cone angle plus or minus 10° relative to a plane perpendicular to said central axis, the radially outward portion of said shoulder terminating in a sharp circumferential edge defined by said symmetrical surface and a cylindrical surface of said male joint means; and a coupling member having bore means comprising means defining a first and a second bore each having a first and a second end, the first and second bores being aligned about a central axis, the second end of the first bore opposing the second end of the second bore, the first and second bores each terminating in a coupling member opening at the first end and in stop means at the second end, the stop means adjoining female sealing means, each female sealing member comprising an annular groove having a forward conical surface increasing in diameter toward the opening and a rearward shoulder engaging said rearward shoulder on said male sealing means so that the female sealing means substantially corresponds to the male sealing means and cooperates with the male sealing means to support the functional members in axial alignment and to form a seal and the rearward shoulders of the male and female sealing means cooperating to resist an axial force tending to urge the tubular conduit portion out of the coupling member.

11. Laboratory glassware system as set forth in claim 10, wherein an inner conduit cooperates with the first bore and forms a restricted inner diameter, and the inner conduit projects beyond the coupling member opening of the second bore; and the area intermediate the first and second bores includes means defining an orifice to pull a vacuum, said orifice communicating with the second bore but not with the first bore.

12. Laboratory glassware system as set forth in claim 10, wherein the area between the first and second bores has means defining an elongated opening with a central diameter able to be restricted and the central diameter includes restricting means for further regulating the size of the central diameter.

13. Laboratory glassware system as set forth in claim 10, wherein the first and second bores of the coupling member each include at the first end a second conical surface adjacent the coupling member opening and having an inner diameter increasing toward the coupling member opening to facilitate insertion of the tubular conduit portion.

14. Laboratory glassware system as set forth in claim 13, wherein the maximum inner diameter of the second conical surface at each coupling member opening is substantially equal to the maximum outer diameter of the conical surface of the tubular conduit portion.

15. Laboratory glassware system as set forth in claim 10, wherein the coupling member includes integral support means such that the two functional members can be supported in vertical axial alignment by said integral support means.

16. Laboratory glassware system as set forth in claim 15, wherein the integral support means comprises a rod operatively connected to the coupling member and extending transverse to the central axis of the coupling member.

17. Laboratory glassware system as set forth in claim 10, wherein the bore means includes filter means intermediate the second ends of the first and second bores.

18. Laboratory glassware system as set forth in claim 17, wherein the filter means includes two annular planar surfaces forming the stop means.

19. Laboratory glassware system as set forth in claim 10, wherein the stop means comprise seating members having means defining a central hole and an annular planar surface which cooperates and is coextensive with the planar opening of the tubular conduit portion.

20. Laboratory glassware system as set forth in claim 19 wherein the seating members comprise a gasket having means defining a central hole, the diameter of the hole substantially corresponding to the inner diameter of the tubular conduit portions.

21. Laboratory glassware system as set forth in claim 20, wherein the inner diameter of the tubular conduit portion is from about 5 to about 15 millimeters, the tubular conduit portion has an outer diameter of from about 6 to about 18 millimeters, and the annular flange has an outer diameter of from about 7 to about 22 millimeters.

22. Laboratory glassware system as set forth in claim 21, wherein the surface formed by the outer diameter of the tubular conduit portion as well as the corresponding surface formed by the inner diameter of the first and second bores includes a taper having a diameter increasing toward the male and female sealing means respectively.

* * * * *